United States Patent [19]

Babcock et al.

[11] Patent Number: 5,219,222

[45] Date of Patent: * Jun. 15, 1993

[54] METHOD OF MIXING PARTICULATE MATERIALS IN A MIXING COLUMN

[75] Inventors: H. Nash Babcock, Old Greenwich; Edward P. Holub, Bethel Trumbull, both of Conn.

[73] Assignee: Nomix Corporation, Fairfield, Conn.

[*] Notice: The portion of the term of this patent subsequent to Mar. 22, 2005 has been disclaimed.

[21] Appl. No.: 168,715

[22] Filed: Mar. 16, 1988

Related U.S. Application Data

[60] Continuation-in-part of Ser. No. 53,561, May 21, 1987, Pat. No. 4,732,781, which is a continuation-in-part of Ser. No. 843,316, Mar. 24, 1986, abandoned, and a continuation-in-part of Ser. No. 49,906, May 15, 1987, Pat. No. 4,747,878, which is a division of Ser. No. 843,316, Mar. 24, 1986, abandoned.

[51] Int. Cl.$^5$ .......................... B28C 5/04; B01F 15/02
[52] U.S. Cl. .......................... 366/2; 106/723; 366/9; 366/177; 366/189; 405/233; 405/263; 405/269
[58] Field of Search .......................... 366/2, 6, 9, 1, 30, 366/33, 34, 37, 40, 189, 192, 150, 160, 167, 165, 177, 336, 337, 338, 339, 340, 147, 130; 106/724, 772, 778, 802, 723, 638, 690, 691, 692, 696, 713; 405/222, 223, 266, 233, 263, 269; 427/140, 136, 397.7, 180, 181, 425, 403, 385.5, 326, 402.1, 408, 409, 410

[56] References Cited

U.S. PATENT DOCUMENTS

| | | | |
|---|---|---|---|
| 188,123 | 3/1877 | Goodridge, Jr. | 405/222 |
| 358,853 | 3/1887 | Goodridge, Jr. | 405/222 |
| 722,782 | 3/1903 | Weaver . | |
| 743,525 | 11/1903 | Lake . | |
| 930,086 | 8/1909 | Reed | 366/9 |
| 1,029,126 | 6/1912 | Hoover . | |
| 1,047,680 | 12/1912 | Mills et al. . | |
| 1,107,237 | 8/1914 | Smith . | |
| 1,391,678 | 9/1921 | Francois . | |
| 1,473,990 | 11/1923 | Huber . | |
| 1,920,463 | 8/1933 | Edwards . | |

(List continued on next page.)

FOREIGN PATENT DOCUMENTS

| | | | |
|---|---|---|---|
| 726570 | 1/1966 | Canada | 366/9 |
| 385212 | 12/1923 | Fed. Rep. of Germany | 366/9 |
| 621902 | 11/1935 | Fed. Rep. of Germany | 405/222 |
| 2027466 | 9/1970 | France . | |
| 793627 | 1/1981 | U.S.S.R. | 366/30 |
| 893247 | 12/1981 | U.S.S.R. | 366/1 |
| 1234192 | 5/1986 | U.S.S.R. . | |
| 853624 | 11/1960 | United Kingdom | 366/34 |

OTHER PUBLICATIONS

Quikrete Quick-Setting Cement container (date unknown).
Quikrete Construction Products brochure, 1987 (month unknown).

(List continued on next page.)

*Primary Examiner*—Harvey C. Hornsby
*Assistant Examiner*—Charles Cooley
*Attorney, Agent, or Firm*—Weingram & Zall

[57] ABSTRACT

A method of mixing materials includes a fluid medium, such as an aqueous fluid or a gas, continuously introduced into a mixing column for a time sufficient to allow the fluid to at least substantially fill the column. A predetermined amount of at least one primary material is introduced into the upper end of the mixing column. The primary material is permitted to descend through the fluid medium at a predetermined rate. Secondary materials are introduced into the mixing column through at least one end or through at least one position along the side of the mixing column at an angle and velocity sufficient to cause the secondary materials to intimately contact the primary material along its path of descent through the fluid medium so that the primary and secondary materials are continuously mingled as they descend through the fluid medium until they reach the lower end of the mixing column. Another aspect of the invention relates to the mixed materials which are recovered from the lower end of the mixing column.

8 Claims, 1 Drawing Sheet

U.S. PATENT DOCUMENTS

| | | |
|---|---|---|
| 2,138,172 | 11/1938 | Johnson . |
| 2,306,962 | 12/1942 | Kropp ............................ 366/165 |
| 3,088,713 | 5/1963 | Gard ............................... 366/160 |
| 3,582,376 | 6/1971 | Ames ............................. 106/97 X |
| 3,665,720 | 5/1972 | Havno ............................ 405/226 |
| 3,682,676 | 8/1972 | Karrh et al. . |
| 3,683,760 | 8/1972 | Silva . |
| 3,725,105 | 4/1973 | Chase . |
| 3,730,763 | 5/1973 | Schlottmann et al. ......... 118/303 X |
| 3,745,775 | 7/1973 | Kahn ............................... 405/222 |
| 3,825,433 | 7/1974 | Arnoldi et al. .................. 106/97 X |
| 3,914,359 | 10/1975 | Bevan ............................. 264/45.3 |
| 3,922,832 | 12/1975 | Dicker ............................ 405/18 X |
| 3,927,163 | 12/1975 | Gabriel et al. ................... 264/71 |
| 3,955,992 | 5/1976 | Roberts .......................... 106/90 |
| 4,042,407 | 8/1977 | Natsuume ...................... 106/97 X |
| 4,086,663 | 4/1978 | Croft ............................... 366/177 X |
| 4,129,449 | 12/1978 | Kojima ........................... 405/266 X |
| 4,175,867 | 11/1979 | Piazza ............................. 366/9 |
| 4,243,696 | 1/1981 | Toth ................................ 427/27 |
| 4,301,763 | 11/1981 | Goldstone et al. .............. 118/308 |
| 4,366,209 | 12/1982 | Babcock ......................... 106/104 X |
| 4,367,986 | 1/1983 | Miyoshi et al. ................. 106/97 X |
| 4,374,672 | 2/1983 | Funston et al. ................. 106/DIG. 1 X |
| 4,390,372 | 6/1983 | Hardin ............................ 106/97 X |
| 4,461,856 | 7/1984 | Willis et al. .................... 106/90 X |
| 4,472,201 | 9/1984 | Ochi et al. ...................... 106/98 |
| 4,487,633 | 12/1984 | Sakuta et al. ................... 106/97 X |
| 4,504,315 | 3/1985 | Allemann et al. ............... 106/97 X |
| 4,732,781 | 3/1988 | Babcock et al. ................ 427/140 |
| 4,732,782 | 3/1988 | Babcock et al. ................ 427/427 |
| 4,747,878 | 5/1988 | Babcock et al. ................ 106/97 |
| 4,772,326 | 9/1988 | Heinen et al. ................... 106/85 |

OTHER PUBLICATIONS

Quikrete Rapid Road Repair brochure, 1984 (month unknown).
Gifford-Hill, Non-Shrink Grouts brochure, Oct. 1988.
Master Builders, Master Flow 713 Grout brochure, 1987 (month unknown).
Quikrete Hydraulic Cement bag (date unknown).
Build and Repair With Concrete, The Complete Do-It-Yourself Manual, The Quikrete Companies, 1986, pp. 21-22 (month unknown).
Quikrete Hydraulic Water-Stop, Instant-Plug Cement container (date unknown).
Genstar Building Materials, Concrete Repair Center, brochure (date unknown).
Gifford-Hill Supreme Pre-Mixed Non-Shrink Grout bag (date unknown).
Master Builders Master Flow 713 Grout bag (date unknown).
Set, Quick Post (date unknown).
Sakrete, ® 11. Children's Play Yard. (date unknown).
The King of Concrete Article (Jul. 1986, World Fence News).
Set Consumer Products Inc., "Set . . . Hold It" (date unknown).
1950's Film, Popeye Cartoon (date unknown).
Sat—Base II, Rapid Cure Cement Bag, 1985 (month unknown).
Quikrete, Rapid Road Repair Bag (date unknown).
Quikrete, Quick Setting Cement Bag (date unknown).
Quikrete, Post Concrete Mix Bag (date unknown).
Sakrete's Project Booklet (date unknown).
Nakahara et al., "The Prepacked Concrete in Water Using Artificial Extremely Fine Sand," The Cement Assoc. of Japan, Rev. of 27th Meetings, pp. 199-201 (May 1973) month unknown.
Sakrete Concrete Mix does it best for less, copyright 1981 (month unknown).
Sakrete ®, 15 Easy Steps to Greater Home Enjoyment, 1984 (month unknown).
Sakrete ®, Save With Sakrete ® Products, 1984 (month unknown).
Quikrete ®, Do-It-Yourself Series, Treating Wet or Leaking Basement Walls (date unknown).
Quikrete ®, Do It Yourself Projects With Cement Mixes, 1974 (month unknown).
Quikrete ®, Handyman . . . Complete Guide to Home Maintenance 1975 (month unknown).

METHOD OF MIXING PARTICULATE MATERIALS IN A MIXING COLUMN

CROSS REFERENCE TO RELATED APPLICATIONS

This application is (1) a continuation-in-part of application Ser. No. 07/053,561, filed May 21, 1987, now U.S. Pat. No. 4,732,781, which is a continuation-in-part of application Ser. No. 06/843,316, filed Mar. 24, 1986, abandoned; and (2) a continuation-in-part of application Ser. No. 07/049,906, filed May 15, 1987, now U.S. Pat. No. 4,747,878, which is a division of application Ser. No. 06/843,316, filed Mar. 24, 1986, abandoned.

FIELD OF THE INVENTION

This invention relates to a method of mixing materials. One particular aspect relates to a method of mixing or combining cementitious materials, but the mixing or combining of other materials are also within the scope of this invention.

BACKGROUND ART

In the manufacture and installation of cementitious compositions, two types of mixing are used. Initially, the various ingredients used to form the compositions are combined by dry blending or other dry mixing techniques. Such techniques include the use of mixing equipment having a rotary screw, or blades or baffles rotating in a stationary housing, or those having a rotating or "tumbling" housing with blades or baffles fixed therein. The dry ingredients are thus combined to form a uniformly mixed or homogenous dry composition.

Thereafter, these conventional dry compositions are supplied to a job site in bag or bulk form, and are prepared for installation by mixing with water to hydrate the cementitious components so that the mixture can cure to a solid mass. Cementitious compositions can also be prepared by mixing the individual ingredients, such as cement, sand and some type of aggregate, and an aqueous fluid, such as water, by hand or with some type of mechanical mixer. In any event, the individual ingredients must be thoroughly co-mingled and wet mixed with the proper amount of water to hydrate the dry components so as to provide a final cementitious composition with the requisite integrity for commercial use.

While hand mixing can prove to be a most effective way of attaining a cementitious product of proper composition and integrity, the labor and manpower involved have compelled most workers to resort to automated mixing devices. These devices, however, have the disadvantage of being complex and requiring great expenditures of money to supply the energy required for routine operation. In addition, since these devices usually include grinding, blenders or other types of mixing components, the ordinary wear and tear of these parts minimize the effective longevity of the device. Naturally, the worn-out parts could be replaced, but this would require further expenditures of money and could result in machine shutdown time.

In recognizing the need for a more cost-effective and practical mixing device, U.S. Pat. Nos. 722,782; 1,029,126; 1,047,680; 1,107,237; 1,473,990; and 4,175,867 each disclose a device for mixing concrete wherein the mixing occurs through a combination of gravitational forces, the structural arrangements of the devices and-/or the introduction of pressurized or unpressurized water.

Similarly, U.S. Pat. No. 1,920,463 describes a method of manufacturing artificial sandstone wherein all of the mixing is done by spraying under pressure and where the materials are mixed while freely falling from elevated hoppers directly into the molds defining the contour of the finished product; and U.S. Pat. No. 2,138,172 discloses a batching apparatus wherein a combination of gravitational forces and specially designed baffle means contribute to the batching of the individual components.

SUMMARY OF THE INVENTION

Broadly stated, the present invention relates to a method of mixing materials which comprises continuously introducing a fluid medium into a mixing column having an upper and lower end for a time sufficient to allow the fluid to at least substantially fill the column; introducing a predetermined amount of at least one primary material into the upper end of the mixing column; permitting the primary material to descend through the fluid medium at a predetermined rate; introducing at least one secondary material into the mixing column through at least one position into the upper end of the mixing column along at least one side thereof at an angle and velocity sufficient to cause the secondary material to intimately contact the primary material along its path of descent through the fluid medium so that the primary and secondary materials are continuously mingled as they descend through the fluid medium until they reach the lower end of the mixing column; and recovering the mixed materials from the lower end of the mixing column. The primary and secondary materials can each be formulated in the form of particles, with the major proportion of the particles having substantially the same drop rate along the distance that these materials descend through the column. Preferably, all particles should possess substantially the same drop rate for optimum mingling and blending as they descend through the column.

One specific application of the present invention relates to a method of manufacturing a cementitious composition which comprises continuously introducing water into a mixing column having an upper and lower end for a time sufficient to allow the water to at least substantially fill the column; introducing a predetermined amount of at least one cement material into the upper end of the mixing column; permitting the cement material to descend through the water at a predetermined rate; introducing at least one secondary material into the upper end of the mixing column through at least one position along at least one side thereof at an angle and velocity sufficient to cause the secondary material to intimately contact the cement material along its path of descent through the water so that the cement material and secondary material are continuously mingled as they descend through the water until they reach the lower end of the mixing column; and recovering the mixed cementitious composition from the lower end of the mixing column. In this embodiment, preferred secondary materials are filler components, such as sand or aggregate, or an additive for imparting a certain characteristic to the final cementitious composition. Such additives include an accelerator, retarder, water reducing compound, pumping aid, water absorbing compound, waterproofing agent, polymer, drying shrinkage inhibitor, wet shrinkage inhibitor, lime, a pigment, bonding agent, or curing agent. When the cement binder and filler are added together to the upper end of the column in the form of particles, a major proportion of the particles, and preferably substantially all the particles, should have approximately the same drop rate to facilitate mixing as they descend through the column.

Another aspect of tn relates to a method of making a dry cementitious composition which is capable of setting and curing to a solid mass when poured upon or through excess water. This method includes the steps of providing a cementitious composition in the form of finely divided particles comprising at least one cement binder and a filler component and adjusting the drop rate of the particles such that at least a major proportion thereof possess approximately the same drop rate, so that the composition is capable of setting and curing to a solid mass when poured into an amount of water which is present in excess of that needed to completely hydrate the composition without any type of physical mixing of the cementitious composition and water other than that which occurs when the composition is poured into the water. Preferably, substantially all the particles have approximately the same drop rate and the cement binder is present in the composition in an amount of at least 20 weight percent, although amounts of as low as 10 percent can provide acceptable performance.

The drop rate of the primary material, which in one aspect is a cement material, in the fluid medium can be determined prior to introducing it into the mixing column so that the locus of the primary material in the mixing column may be determined at any given time. Also, the rate at which the primary material descends through the fluid medium can be adjusted by modifying the size, density and/or shape of the primary material to permit it to descend more freely through the fluid medium. In addition, the drop speed of the primary material can be changed by dropping the material from an increased height or by utilizing a second fluid to impart an increased velocity to particles. The same considerations apply to the drop rate of the secondary material, i.e., the filler or additive. Also, a surfactant can be added to the fluid media to reduce surface and/or interfacial tension thereby facilitating the dispersal of the primary or secondary material through the fluid medium.

Thus, since the method of the present invention does not require an energy supply to provide a thoroughly mixed final cementitious composition of proper integrity, the costs associated with standard mixing methods are dramatically minimized. Furthermore, those problems encountered with respect to the deterioration of machine parts ascribed to wear and tear are substantially eliminated. Other advantages include the elimination of noises associated with standard machine operations, as well as an elimination of any pollution problem, since the present method is performed in a closed circuit.

The method of the present invention is equally applicable to the mixing of non-cementitious materials to form non-cementitious mixtures. Specifically, the method of the present invention can be used to blend or mix a variety of materials to produce food products, medicinal products, resins and other commercially marketed products. Also, the mixed materials form another aspect of this invention.

BRIEF DESCRIPTION OF THE DRAWINGS

These and other features of the invention will now be described by way of example with reference to various embodiments of the invention as illustrated in the accompanying drawing, wherein:

FIG. 1, when considered along with the description provided herebelow, further provides a schematic representation of the method of the present invention.

DESCRIPTION OF THE PREFERRED EMBODIMENTS

Figure 1:
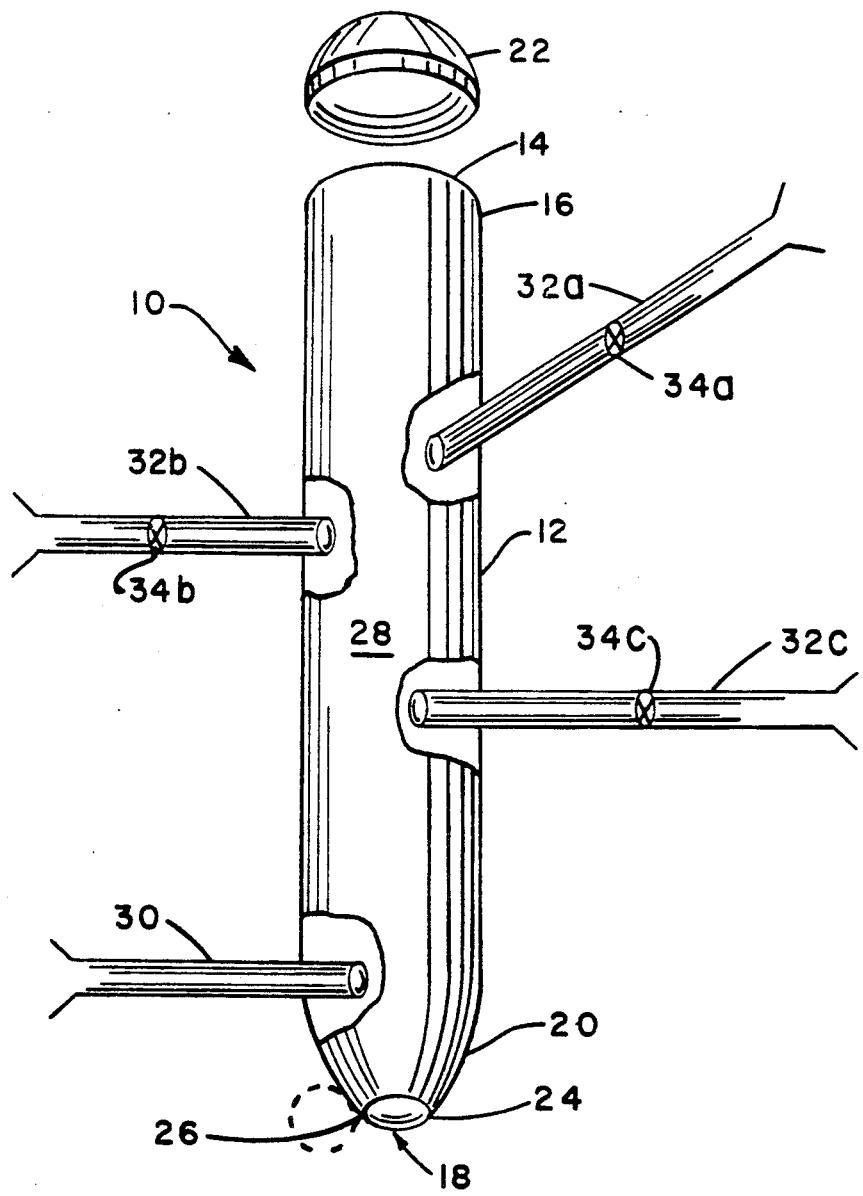
FIG. 1 is a perspective view of an apparatus particularly suited for performing the method of the present invention.

For purposes of convenience and to convey the details of a preferred embodiment, this description will relate to a method of mixing or combining cementitious materials to provide a cementitious composition. It is to be clearly understood, however, that other materials may be mixed or combined in accordance with the present invention to provide non-cementitious compositions or mixtures.

The primary material used to prepare the cementitious composition in accordance with the method of the present invention can include, but should not be limited to, Portland cement, gypsum, high aluminum cement, other specialty cements, mortar and combinations thereof. The term primary material also includes modified cements, such as those containing about 20 to 30 percent of tricalcium aluminate. (Conventional Portland cement contains about 10 to 15 percent tricalcium aluminate.) In these materials, it is advantageous to reduce the iron and calcium oxide content of the composition to as low a value as practical for optimum results.

The primary material can also include other cements which fall under the term "hydraulic cement." This term is used herein to mean expansive cements, air entraining cements, pozzolanic cements, slag cement, masonry cement, white portland cement, colored cement, antibacterial cement, waterproof cement, blast furnace cement, refractory cement, self-stressing cement and similar materials, in addition to the materials mentioned above.

Also, the term "gypsum" as used herein is intended to include gypsum such as is normally understood in the art. This would include calcium sulfate ($CaSO_4$) and its various forms such as calcium sulfate anhydrate, calcium sulfate hemihydrate, and calcium sulfate dihydrate, as well as calcined gypsum, pressure calcined gypsum, and plaster of Paris.

Included among the secondary materials are filler components, such as sand, aggregate particles or mixtures thereof, and a wide variety of additives which may be included to impart certain qualities or characteristics to the final cementitious composition. Such additives can include, but should not be limited to, retarders accelerators, water reducing compounds, pumping aids, water absorbing compounds, waterproofing agents, polymers, drying shrinkage inhibitor, wet shrinkage inhibitors, lime, pigments, bonding agents, curing agents and the like.

Generally, the mixture should have at least 20 percent of a cementitious binder, although the invention is operable with binders as low as about 10 percent by weight. For instance, a cement mix with less than 20% of a cementitious binder should have some additional water absorption agent in the mix to prevent overwatering and segregation, or an accelerator compound which enables the mix to rapidly cure when hydrated with excess water. Ideally, cementitious compositions of the mixtures should have the maximum amount of water absorbency possible. The higher the ratio of chemically bonded water to the binder, the better and more versatile a product will be achieved.

Additional information on preferred cementitious compositions can be found in U.S. patent application 4,747,878, the content of which is expressly incorporated herein by reference thereto.

Referring now to FIG. 1, illustrated is an apparatus for practicing the method of the present invention, which is generally designated by reference numeral 10. The principal component of the apparatus is column 12 which includes ingress means 14 disposed at upper end 16 and egress means 18 disposed at lower end 20. Ingress means 14 is adapted to be sealed by cap 22. Similarly, egress means 18 is adapted to be sealed, as illustrated, by closure member 24, which is pivotably mounted to column 12 by pivot 26 at lower end 20.

Column 12 is illustrated as a cylindrical tube having a tapered lower end 20 of inverted conical shape. To provide a considerable quantity of a final mixed product, column 12 should have a height to diameter ratio of greater than 1:1, preferably greater than about 1.5:1.

A wide range of fluid mediums can be used in this invention. For the preparation of dry mixtures, gases such as air, oxygen, or inert gases such as nitrogen, argon and the like are entirely suitable, as well as mixtures thereof. When hygroscopic particulate materials are to be mixed, the water or moisture content in the gaseous fluid medium should be maintained at a minimum level. If necessary, the gases can be heated to remove any such moisture prior to introducing the fluid into the column.

Other suitable fluid mediums include liquids, such as water or aqueous solutions, including those of an acidic or basic nature. Also, any organic solvent which is a liquid at the operating temperature and pressure (usually ambient and atmospheric) can be used, including paraffinic, aliphatic or aromatic organic solvents such as hexane, decane, benzene, toluene, gasoline, kerosene, and the like. Halogenated (primarily chlorinated) hydrocarbons, such as ethylene dichloride or carbon tetrachloride, are also suitable. While solvents having any flash point can be used, those having a relatively high flash point and appropriate vapor pressure are preferred in order to minimize the possibility of fire or explosion. When low flash point solvents are used, the proper precautions and safeguards relating to fire or explosion hazards should be followed.

One preferred fluid for purposes of this description is water, is introduced into the hollow interior 28 of column 12 by way of fluid inlet means 30. The water is introduced into the bottom of the column with egress means 18 being sealed by closure member 24 so that the water fills the bottom of hollow interior 28 and migrates progressively upward in the direction of upper end 16. When the water has risen to a level so that it at least substantially fills hollow interior 28, the primary material, which for purposes of this description is Portland cement, can be introduced into column 12 through ingress means 14.

The total amount of each material required to produce a final cementitious composition can be determined prior to commencing the practice of the present invention. The specific amount and the type of each ingredient employed, as well as the inclusion or exclusion of one or more additives to obtain a cementitious blend of desired integrity are well known to the skilled artisan and require no elaboration herein.

A predetermined amount of Portland cement is introduced into column 12 through ingress means 14. Once the predetermined amount has been completely introduced into column 12, ingress means 14 is sealed by engagement with closure member 22. As the Portland cement descends through the water disposed in hollow interior 28, the secondary materials can be introduced into column 12 through feed pipes 32a, 32b and 32c, so that they intimately contact and become mingled with the Portland cement along its path of descent. In order to permit any secondary materials to intimately contact the Portland cement along its path of descent, the drop rate of the cement in the water must be determined so that the locus of the cement mass in hollow interior 28 can be determined at any given time. The materials may be introduced at substantially the same position at the upper end of the mixing column.

The drop rate of Portland cement, or any other material, through the fluid medium (i.e. water) is dependent upon several factors such as density and specific gravity, as well as the size, shape and surface characteristics of the material.

Generally, to determine the drop rate of Portland cement, an amount of the dry cement can be poured into a 3 inch diameter open top plastic or glass cylinder that is about 75% filled with water. The time it takes for the cement to completely descend through the water will provide a suitable indication of what the drop rate of the cement is in water. Then, the drop rate of cement in water and the length of the column both being known, one to can easily determine the precise locus of the cement particles within column 12 at any given time. The same procedure can be used to determine the drop rate for the particles of the secondary materials.

If desired, the drop rate of the cement can be somewhat adjusted by the practitioners of the present invention. For instance, the size, density and/or shape of the cement can be modified so that the cement particles can descend more freely through the water. In addition, or alternatively, surfactants can be added to the water, either separately or along with the cement itself, to reduce surface and/or interfacial tension, thereby assisting in the dispersal of the particles through the water. Further, desirable additives for modifying or improving the properties of the hydrated cement mixture can be added to the water instead of being introduced as a particulate additive.

The velocity at which the secondary materials are introduced into hollow interior 28, as well as the amount of such materials to be introduced can be regulated by valves 34a, 34b, 34c. The precise and most desirous angle of introducing the secondary materials into hollow interior 28 along the path of descent of the Portland cement so that the secondary materials intimately contact the Portland cement in order to provide a cementitious composition of desired integrity can be easily ascertained by routine trial and error experimentation.

To discharge the cementitious product from hollow interior 28, closure member 24 is opened so that the product can flow, by gravity, into a suitable receptacle (not shown) so that it can be carted or otherwise transported or directed to a work site.

It is readily apparent to one skilled in the art that the present methods provide substantial advantages in its simplicity of construction, which avoids the use of internal structural components, such as baffles, trays and the like. Furthermore, the avoidance of agitators, impellers and other mixing equipment enables the user to obtain a highly significant reduction in operating costs due to the lower energy input and maintenance requirements of this invention.

As stated above, the method of the present invention can be used to mix or blend non-cementitious materials to produce non-cementitious mixtures. For instance, a variety of organic or inorganic powders can be blended in accordance with the instant method to produce a variety of commercial products, such as food products and medical products. In these instances, the fluid can be an inert gas as opposed to the water specifically used for the present description. The present method can also be used to manufacture organic resins.

The materials of construction for the tower when most particulate compounds are to be mixed can be carbon steel, but other materials can be used for particular applications. For example, stainless steel, or plastic in the form of lined or coated steel or as an integral vessel, can be used where high product purity is required, whereas refractory ceramic, tile, or rubber linings can be used for highly abrasive powders.

While it is preferred that the primary and secondary materials be substantially non-reactive with each other, as well as with the fluid medium, it is also possible to react the primary and secondary materials with each other, or with the fluid medium, to achieve a desired product.

Also contemplated is the situation where the fluid medium contains a component which is capable of combining with the primary and secondary materials to form a desired product. As an example, an accelerator can be added to the water for the mixing of cementitious materials therewith, so that a relatively fast setting composition can be achieved.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of mixing a cementitious composition comprised of a primary material and a secondary material, the method comprising:

introducing water into a mixing column having an upper and lower end and a plurality of inlets along the height thereof, the column being substantially free from internal horizontal structural components, the water being present in an amount sufficient to allow the water to at least substantially fill the column;

introducing at least one primary material in the form of dry solid particles through the upper end of the mixing column;

permitting the primary material to freely descend through the water at a predetermined rate;

introducing at least one secondary material in the form of dry solid particles into the mixing column at another of the plurality of inlets at another position along the height of the mixing column and at a time, direction and velocity sufficient to cause the secondary material to freely descend with the primary material through the water so that the primary and secondary materials are continuously intermingled as they descend through the water until, at substantially the same time, they reach the lower end of the mixing column to form a substantially non-segregated mass of cementitious composition;

wherein a major portion of each of the particles of the primary and secondary materials each have a drop rate substantially the same as the materials freely descend through the water; and removing the cementitious composition from the lower end of the mixing column;

whereby, when the cementitious composition is allowed to set and cure, a solid and substantially non-segregated mass is formed.

2. The method of claim 1 which further comprises formulating the primary and secondary materials with substantially the same drop rate and introducing the primary and secondary materials at substantially the same position at the upper end of the mixing column.

3. The method of claim 1 wherein the primary material comprises Portland cement. tricalcium aluminate cements other than Portland cement, gypsum, high-aluminum cement, magnesium phosphate, aluminum silicate or combinations thereof.

4. The method of claim 1 wherein the secondary material comprises one or more of a filler component or additive to impart predetermined characteristics to the cured cementitious composition.

5. The method of claim 4 wherein the filler component is sand, aggregate, or mixtures thereof.

6. The method of claim 4 wherein the additive is an accelerator, retarder, water reducing compound, pumping aid, water absorbing compound, waterproofing agent, polymer, drying shrinkage inhibitor, wet shrinkage inhibitor, lime, a pigment, bonding agent or curing agent.

7. The method of claim 1 wherein the mixing column has a height and a diameter and the height to diameter ratio of the mixing column is greater than 1:1.

8. The method of claim 1 which further comprises adjusting the rate at which the primary material descends through the water by modifying at least one of the size, density or shape of the particles of the primary material.

* * * * *